US008903016B2

(12) United States Patent
Walton et al.

(10) Patent No.: US 8,903,016 B2
(45) Date of Patent: Dec. 2, 2014

(54) SPATIAL SPREADING IN A MULTI-ANTENNA COMMUNICATION SYSTEM

(75) Inventors: Jay Rodney Walton, Carlisle, MA (US);
Lizhong Zheng, Canton, MA (US);
John W. Ketchum, Harvard, MA (US);
Mark S. Wallace, Bedford, MA (US);
Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 13/526,160

(22) Filed: Jun. 18, 2012

(65) Prior Publication Data

US 2012/0250788 A1 Oct. 4, 2012

Related U.S. Application Data

(63) Continuation of application No. 11/008,865, filed on Dec. 9, 2004, now Pat. No. 8,204,149.

(60) Provisional application No. 60/531,021, filed on Dec. 17, 2003.

(51) Int. Cl.
| | | |
|---|---|---|
| H04L 27/26 | (2006.01) | |
| H04B 7/02 | (2006.01) | |
| H04B 7/06 | (2006.01) | |
| H04L 1/06 | (2006.01) | |
| H04B 7/04 | (2006.01) | |

(52) U.S. Cl.
CPC ............... *H04L 1/06* (2013.01); *H04B 7/0669* (2013.01); *H04B 7/0417* (2013.01)
USPC .......................................... 375/299; 455/101

(58) Field of Classification Search
CPC .. H04B 7/0678; H04B 7/0417; H04B 7/0669; H04B 7/043; H04B 7/0615; H04L 5/0007; H04L 1/06; H04W 52/42; H04J 11/003
USPC ......... 375/259, 260, 267, 295, 299, 130, 140, 375/144, 146; 370/203, 208, 209; 455/91, 455/101
See application file for complete search history.

(56) References Cited

U.S. PATENT DOCUMENTS 5,581,583 A 12/1996 Conti et al.
5,668,837 A 9/1997 Dent
(Continued)

FOREIGN PATENT DOCUMENTS

CA 2490520 A1 12/2003
CN 1476695 A 2/2004
(Continued)

OTHER PUBLICATIONS

Agustin A et al: "LDC Construction with a Defined Structure [MIMO Linear Dispersive Codes]" Vehicular Technology Confernece, 2003. VTC 2003-Fall. 2003 IEEE 58th Orlando, FL, USA Oct. 6-9, 2003, Piscataway NJ, USA, IEEE, US, Oct. 6, 2003, pp. 433-437 vol. 1. XP010700754 ISBN:0-7803-7954-3.

(Continued)

*Primary Examiner* — Tesfaldet Bocure
(74) *Attorney, Agent, or Firm* — Anthony R. Morris (57) ABSTRACT

Spatial spreading is performed in a multi-antenna system to randomize an "effective" channel observed by a receiving entity for each transmitted data symbol block. For a MIMO system, at a transmitting entity, data is processed (e.g., encoded, interleaved, and modulated) to obtain $N_D$ data symbol blocks to be transmitted in $N_M$ transmission spans, where $N_D \geq 1$ and $N_M > 1$. The $N_D$ blocks are partitioned into $N_M$ data symbol subblocks, one subblock for each transmission span. A steering matrix is selected (e.g., in a deterministic or pseudo-random manner from among a set of L steering matrices, where L>1) for each subblock. Each data symbol subblock is spatially processed with the steering matrix selected for that subblock to obtain transmit symbols, which are further processed and transmitted via $N_T$ transmit antennas in one transmission span. The $N_D$ data symbol blocks are thus spatially processed with $N_M$ steering matrices and observe an ensemble of channels.

6 Claims, 7 Drawing Sheets

(56) References Cited

U.S. PATENT DOCUMENTS

| | | | |
|---|---|---|---|
| 5,757,845 A | 5/1998 | Fukawa et al. | |
| 6,061,023 A | 5/2000 | Daniel et al. | |
| 6,118,758 A | 9/2000 | Marchok et al. | |
| 6,144,711 A | 11/2000 | Raleigh et al. | |
| 6,175,743 B1 | 1/2001 | Alperovich et al. | |
| 6,198,775 B1 | 3/2001 | Khayrallah et al. | |
| 6,218,985 B1 | 4/2001 | Adams | |
| 6,298,035 B1 | 10/2001 | Heiskala | |
| 6,314,147 B1 | 11/2001 | Liang et al. | |
| 6,351,499 B1 | 2/2002 | Paulraj et al. | |
| 6,441,786 B1 | 8/2002 | Jasper et al. | |
| 6,452,981 B1 | 9/2002 | Raleigh et al. | |
| 6,473,467 B1 | 10/2002 | Wallace et al. | |
| 6,477,161 B1 | 11/2002 | Hudson et al. | |
| 6,486,828 B1 | 11/2002 | Cahn et al. | |
| 6,493,331 B1 | 12/2002 | Walton et al. | |
| 6,496,535 B2 | 12/2002 | Xu | |
| 6,542,556 B1 | 4/2003 | Kuchi et al. | |
| 6,545,997 B1 | 4/2003 | Boehnke et al. | |
| 6,618,454 B1 | 9/2003 | Agrawal et al. | |
| 6,636,568 B2 | 10/2003 | Kadous | |
| 6,642,888 B2 | 11/2003 | Kishigami et al. | |
| 6,678,263 B1 | 1/2004 | Hammons, Jr. et al. | |
| 6,694,147 B1 | 2/2004 | Viswanath et al. | |
| 6,711,124 B2 | 3/2004 | Khayrallah et al. | |
| 6,711,528 B2 | 3/2004 | Dishman et al. | |
| 6,760,388 B2 | 7/2004 | Ketchum et al. | |
| 6,763,073 B2 | 7/2004 | Foschini et al. | |
| 6,771,706 B2 | 8/2004 | Ling et al. | |
| 6,785,341 B2 | 8/2004 | Walton et al. | |
| 6,788,661 B1 | 9/2004 | Ylitalo et al. | |
| 6,801,790 B2 | 10/2004 | Rudrapatna | |
| 6,804,307 B1 | 10/2004 | Popovic | |
| 6,810,506 B1 | 10/2004 | Levy | |
| 6,816,555 B2 | 11/2004 | Sakoda | |
| 6,842,487 B1 | 1/2005 | Larsson | |
| 6,847,306 B2 | 1/2005 | Diba et al. | |
| 6,859,747 B2 | 2/2005 | Yutkowitz | |
| 6,862,271 B2 | 3/2005 | Medvedev et al. | |
| 6,873,606 B2 | 3/2005 | Agrawal et al. | |
| 6,888,789 B1 | 5/2005 | Sakoda et al. | |
| 6,937,189 B2 | 8/2005 | Kim | |
| 6,940,917 B2 | 9/2005 | Menon et al. | |
| 6,952,454 B1 | 10/2005 | Jalali et al. | |
| 6,956,897 B1 | 10/2005 | Honig | |
| 6,975,668 B2 | 12/2005 | Zhang | |
| 6,982,946 B2 | 1/2006 | Wiberg et al. | |
| 6,999,472 B2 | 2/2006 | Hamalainen et al. | |
| 7,002,900 B2 | 2/2006 | Walton et al. | |
| 7,020,110 B2 | 3/2006 | Walton et al. | |
| 7,020,490 B2 | 3/2006 | Khatri | |
| 7,024,166 B2 | 4/2006 | Wallace et al. | |
| 7,031,669 B2 | 4/2006 | Vaidyanathan et al. | |
| 7,057,555 B2 | 6/2006 | Lewis | |
| 7,061,969 B2 | 6/2006 | Alamouti et al. | |
| 7,065,144 B2 | 6/2006 | Walton et al. | |
| 7,065,156 B1 | 6/2006 | Kuchi | |
| 7,076,263 B2 | 7/2006 | Medvedev et al. | |
| 7,079,870 B2 | 7/2006 | Vaidyanathan | |
| 7,092,737 B2 | 8/2006 | Horng et al. | |
| 7,095,709 B2 | 8/2006 | Walton et al. | |
| 7,095,987 B2 | 8/2006 | Brothers, Jr. et al. | |
| 7,099,678 B2 | 8/2006 | Vaidyanathan | |
| 7,099,698 B2 | 8/2006 | Tarokh et al. | |
| 7,110,350 B2 | 9/2006 | Li et al. | |
| 7,110,378 B2 | 9/2006 | Onggosanusi et al. | |
| 7,110,463 B2 | 9/2006 | Wallace et al. | |
| 7,116,723 B2 | 10/2006 | Kim et al. | |
| 7,130,580 B2 | 10/2006 | Alexiou et al. | |
| 7,149,254 B2 | 12/2006 | Sampath | |
| 7,151,806 B2 | 12/2006 | Hosoda et al. | |
| 7,151,809 B2 | 12/2006 | Ketchum et al. | |
| 7,158,498 B2 | 1/2007 | Lundby et al. | |
| 7,158,579 B2 | 1/2007 | Hottinen | |
| 7,190,734 B2 | 3/2007 | Giannakis et al. | |
| 7,194,042 B2 | 3/2007 | Walton et al. | |
| 7,197,084 B2 | 3/2007 | Ketchum et al. | |
| 7,200,631 B2 | 4/2007 | Mailaender et al. | |
| 7,206,354 B2 | 4/2007 | Wallace et al. | |
| 7,218,689 B2 | 5/2007 | Gupta | |
| 7,227,906 B2 | 6/2007 | Fukuda et al. | |
| 7,236,478 B2 | 6/2007 | Wu et al. | |
| 7,280,625 B2 | 10/2007 | Ketchum et al. | |
| 7,292,623 B2 | 11/2007 | Reznik | |
| 7,298,805 B2 | 11/2007 | Walton et al. | |
| 7,301,924 B1 | 11/2007 | Gurbuz et al. | |
| 7,302,009 B2 | 11/2007 | Walton et al. | |
| 7,317,750 B2 | 1/2008 | Shattil | |
| 7,324,429 B2 | 1/2008 | Walton et al. | |
| 7,324,482 B2 | 1/2008 | Hammons, Jr. et al. | |
| 7,327,795 B2 | 2/2008 | Oprea | |
| 7,327,798 B2 | 2/2008 | Won | |
| 7,327,800 B2 | 2/2008 | Oprea et al. | |
| 7,336,727 B2 | 2/2008 | Mukkavilli et al. | |
| 7,336,746 B2 | 2/2008 | Walton et al. | |
| 7,356,073 B2 | 4/2008 | Heikkila | |
| 7,359,466 B2 | 4/2008 | Huang et al. | |
| 7,385,617 B2 | 6/2008 | Tahat | |
| 7,394,754 B2 | 7/2008 | Li et al. | |
| 7,436,896 B2 | 10/2008 | Hottinen et al. | |
| 7,447,268 B2 | 11/2008 | Sadowsky et al. | |
| 7,522,673 B2 | 4/2009 | Giannakis et al. | |
| 7,529,177 B2 | 5/2009 | Celebi et al. | |
| 7,532,563 B1 | 5/2009 | Shirali et al. | |
| 7,539,253 B2 | 5/2009 | Li et al. | |
| 7,555,053 B2 | 6/2009 | Trachewsky et al. | |
| 7,583,747 B1 | 9/2009 | Damen et al. | |
| 7,593,317 B2 | 9/2009 | Yuda et al. | |
| 7,653,142 B2 | 1/2010 | Ketchum et al. | |
| 7,711,762 B2 | 5/2010 | Howard et al. | |
| 7,742,546 B2 | 6/2010 | Ketchum et al. | |
| 7,764,754 B2 | 7/2010 | Walton et al. | |
| 7,787,554 B1 | 8/2010 | Nabar et al. | |
| 7,894,548 B2 | 2/2011 | Walton et al. | |
| 7,895,254 B2 | 2/2011 | Ketchum et al. | |
| 7,899,131 B2 | 3/2011 | Walton et al. | |
| 7,907,689 B2 | 3/2011 | Walton et al. | |
| 7,974,359 B2 | 7/2011 | Gorokhov et al. | |
| 7,978,649 B2 | 7/2011 | Howard et al. | |
| 7,978,778 B2 | 7/2011 | Wallace et al. | |
| 7,991,065 B2 | 8/2011 | Wallace et al. | |
| 8,169,889 B2 | 5/2012 | Walton et al. | |
| 8,204,149 B2 | 6/2012 | Walton et al. | |
| 8,208,364 B2 | 6/2012 | Walton et al. | |
| 8,285,226 B2 | 10/2012 | Lundby et al. | |
| 8,290,089 B2 | 10/2012 | Howard et al. | |
| 8,325,844 B2 | 12/2012 | Walton et al. | |
| 2001/0053124 A1 | 12/2001 | Ichihara et al. | |
| 2002/0009125 A1 | 1/2002 | Shi | |
| 2002/0091943 A1 | 7/2002 | Lau | |
| 2002/0102940 A1 | 8/2002 | Bohnke et al. | |
| 2002/0193146 A1 | 12/2002 | Wallace et al. | |
| 2002/0196742 A1 | 12/2002 | Baker et al. | |
| 2003/0011274 A1 | 1/2003 | Saint-Michel et al. | |
| 2003/0026349 A1 | 2/2003 | Onggosanusi et al. | |
| 2003/0072254 A1 | 4/2003 | Ma et al. | |
| 2003/0072382 A1* | 4/2003 | Raleigh et al. | 375/267 |
| 2003/0112745 A1 | 6/2003 | Zhuang et al. | |
| 2003/0123567 A1 | 7/2003 | Shigemasa et al. | |
| 2003/0125040 A1 | 7/2003 | Walton et al. | |
| 2003/0161412 A1 | 8/2003 | Niida et al. | |
| 2003/0181211 A1 | 9/2003 | Razavilar et al. | |
| 2003/0186698 A1 | 10/2003 | Holma et al. | |
| 2003/0189999 A1 | 10/2003 | Kadous | |
| 2003/0228850 A1 | 12/2003 | Hwang | |
| 2003/0235238 A1 | 12/2003 | Schelm et al. | |
| 2003/0235255 A1 | 12/2003 | Ketchum et al. | |
| 2004/0002364 A1 | 1/2004 | Trikkonen et al. | |
| 2004/0052315 A1 | 3/2004 | Thielecke et al. | |
| 2004/0066773 A1 | 4/2004 | Sun et al. | |
| 2004/0081263 A1 | 4/2004 | Lee et al. | |
| 2004/0082356 A1 | 4/2004 | Walton et al. | |
| 2004/0085939 A1 | 5/2004 | Wallace et al. | |
| 2004/0157645 A1 | 8/2004 | Smith et al. | |

(56) References Cited

U.S. PATENT DOCUMENTS

| | | |
|---|---|---|
| 2004/0165675 A1 | 8/2004 | Ito et al. |
| 2004/0190639 A1 | 9/2004 | Pauli et al. |
| 2004/0203473 A1 | 10/2004 | Liu |
| 2005/0017511 A1 | 1/2005 | Dalton |
| 2005/0026570 A1 | 2/2005 | Han |
| 2005/0094552 A1 | 5/2005 | Abe et al. |
| 2005/0149320 A1 | 7/2005 | Kajala et al. |
| 2005/0180312 A1 | 8/2005 | Walton et al. |
| 2005/0238111 A1 | 10/2005 | Wallace et al. |
| 2005/0249159 A1 | 11/2005 | Abraham et al. |
| 2005/0265275 A1 | 12/2005 | Howard et al. |
| 2005/0267925 A1 | 12/2005 | Clue |
| 2005/0276347 A1 | 12/2005 | Mujtaba et al. |
| 2006/0067277 A1 | 3/2006 | Thomas et al. |
| 2006/0068718 A1 | 3/2006 | Li et al. |
| 2006/0234789 A1 | 10/2006 | Tarokh et al. |
| 2006/0274844 A1 | 12/2006 | Walton et al. |
| 2006/0285531 A1 | 12/2006 | Howard et al. |
| 2007/0217538 A1 | 9/2007 | Waxman |
| 2007/0249296 A1 | 10/2007 | Howard et al. |
| 2008/0095121 A1 | 4/2008 | Shattil |
| 2008/0273617 A1 | 11/2008 | Lundby et al. |
| 2009/0290657 A1 | 11/2009 | Howard et al. |
| 2010/0074301 A1 | 3/2010 | Howard et al. |
| 2010/0169396 A1 | 7/2010 | Howard et al. |
| 2011/0142097 A1 | 6/2011 | Walton et al. |
| 2012/0213181 A1 | 8/2012 | Walton et al. |
| 2013/0188677 A1 | 7/2013 | Howard et al. |

FOREIGN PATENT DOCUMENTS

| | | |
|---|---|---|
| CN | 1592144 A | 3/2005 |
| EP | 0091999 A1 | 10/1983 |
| EP | 0752793 A2 | 1/1997 |
| EP | 0905920 A2 | 3/1999 |
| EP | 1009124 A2 | 6/2000 |
| EP | 1073214 A1 | 1/2001 |
| EP | 1185001 A2 | 3/2002 |
| EP | 1220506 A1 | 7/2002 |
| EP | 1223702 A1 | 7/2002 |
| EP | 1241824 | 9/2002 |
| EP | 1353452 A2 | 10/2003 |
| EP | 1361686 | 11/2003 |
| EP | 1396956 A1 | 3/2004 |
| JP | 11163822 A | 6/1999 |
| JP | 11205026 A | 7/1999 |
| JP | 2000068975 | 3/2000 |
| JP | 2001077788 A | 3/2001 |
| JP | 2001237751 A | 8/2001 |
| JP | 2002503048 T | 1/2002 |
| JP | 2002524972 | 8/2002 |
| JP | 2003249914 A | 9/2003 |
| JP | 2004023416 A | 1/2004 |
| JP | 2004064654 A | 2/2004 |
| JP | 2004072150 A | 3/2004 |
| JP | 2004096753 A | 3/2004 |
| JP | 2004509556 A | 3/2004 |
| JP | 2004104790 A | 4/2004 |
| JP | 2005027294 A | 1/2005 |
| JP | 2005519567 A | 6/2005 |
| JP | 2005524331 T | 8/2005 |
| JP | 2007504188 A | 3/2007 |
| JP | 2007515829 T | 6/2007 |
| JP | 2007523549 T | 8/2007 |
| JP | 2007523550 T | 8/2007 |
| JP | 2007529972 T | 10/2007 |
| JP | 2007538414 T | 12/2007 |
| KR | 200260860 | 7/2002 |
| RU | 2103768 C1 | 1/1998 |
| RU | 2111619 C1 | 5/1998 |
| RU | 2116698 C1 | 7/1998 |
| RU | 2202152 | 4/2003 |
| RU | 2238611 C1 | 10/2004 |
| TW | 341680 | 10/1998 |
| TW | 350047 | 1/1999 |
| TW | 466385 B | 12/2001 |
| TW | 510103 B | 11/2002 |
| TW | 200304287 | 9/2003 |
| WO | 9737456 A2 | 10/1997 |
| WO | 0014921 A1 | 3/2000 |
| WO | 0044144 A1 | 7/2000 |
| WO | 0156218 A1 | 8/2001 |
| WO | 0219565 A2 | 3/2002 |
| WO | 0225857 A1 | 3/2002 |
| WO | 03047118 A2 | 6/2003 |
| WO | 03056742 A1 | 7/2003 |
| WO | 03063526 A1 | 7/2003 |
| WO | 03077492 A1 | 9/2003 |
| WO | 03094386 A1 | 11/2003 |
| WO | 03101029 A1 | 12/2003 |
| WO | 2004043082 A2 | 5/2004 |
| WO | 2005060298 A1 | 6/2005 |
| WO | 2005088882 A1 | 9/2005 |
| WO | 2005099211 A1 | 10/2005 |

OTHER PUBLICATIONS

Alamouti, S.M., "A Simple Transmit Diversity Technique for Wireless Communications," IEEE Journal on Select Areas in Communications, vol. 16, No. 8, Oct. 1998, pp. 1451-1458.

Antenna-Theory.com, "Steering Vector", http://www.antenna-theory.com, pp. 1., No date given. (Cited by USPTO Examiner in U.S. Appl. No. 10/821,390 on Jan. 11, 2011).

Auer, G., "Channel Estimation for OFDM With Cyclic Delay Diversity," Personal, Indoor and Mobile Radio Communications, 2004. PIMRC 2004, 15th IEEE International Symposium on Sep. 5, 2004, vol. 3, pp. 1792-1796.

Bauch, et al., "Orthogonal Frequency Division Multiple Access with Cyclic Delay Diversity," ITG Workshop on Smart Antennas, Munich Germany, Mar. 18-19, 2004, pp. 17-24.

Bello: "Characterization of Randomly Time-Variante Linear Channels," Communications Systems, IEEE transactions on, vol. 11, Issue 4, pp. 360-393, Dec. 1963.

Bem et al., "Smart Antennas for Mobile Communications Systems," International Conference on Microwaves, Radar and Wireless Communications, vol. 3, May 22, 2000, pp. 120-130, XP010537479.

Bossert, et al., "On Cyclic Delay Diversity in OFDM Based Transmission Schemes," 7th International OFDM-Workshop (INOWO), Sep. 2002, XP002338873, Hamburg, Germany.

Bourdoux et al., "Non-reciprocal transceivers in OFDM/SDMA Systems: Impact and Mitigation," Radio and Wireless Conference, Aug. 10, 2003, pp. 183-186, XP010656728.

Branka et al., "Performance Limits of Multiple-Input Multiple-Output Wireless Communication Systems", Space-Time Coding, John Wiley& Sons. Ltd, Apr. 2003, England, pp. 1-9.

Bruhl et al., "Investigation of Front-end Requirements for MIMO-Systems Using Downlink Pre-Distortion," European Personal Mobile Communications Conference, 2003, pp. 472-476, XP002330243.

Chapter 10, Eigenvalues and Singular Values, pp. 1-39.

Crow, "The Fourier Matrix", Apr. 27, 2001, http://www.maths.abdn.ac.uk/~igc/tch/mx4002/notes/node91.html, pp. 1-3.

Dammann, A. et al., "Beamforming in Combination with Space-Time Diversity for Broadband OFDM Systems", ICC 2002. 2002 IEEE International Conference on Communications. Apr. 28- May 2, 2002, pp. 165-171, XP010589479.

Doonstnejad et al, "Space-time Spreading Codes for a Multiuser MIMO System," Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al., "Link-Optimal Space-Time Processing with Multiple Transmit and Receive Antennas," IEEE Communications Letters, vol. 5, No. 3, pp. 85-87(Mar. 2001).

Giacomantone, Javier Oscar, "Tradeoffs in Arithmetic Architectures for CORDIC Algorithm Design.", pp. 1-9, CeTAD—Fac. De Ingenieria—UNLP, Argentina [presented at IBERCHIP VII Workshop, Session 4, Montevideo, Uruguay, Mar. 21-23, 2001].

(56) References Cited

OTHER PUBLICATIONS

Gilbert et al., "Linear algebra and matrix theory," pressed by Academic Press Inc, Ch. 7, pp. 272-296 Dec. 31, 1995.

Goldsmith, Andrea et al., "Capacity Limits of MIMO Channels, " IEEE Journal on Selected Areas in Communications, vol. 21, No. 5, pp. 684-702, Jun. 2003.

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Hanzo et al., Single and Multi-Carrier DS-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 122-129.

Hochwald et al., "A Transmitter Diversity Scheme for Wideband CDMA Systems based on Space-time Spreading", Selected Areas in Communications, vol. 19, No. 1, Jan. 2001.

Hochwald et al., "Unitary Space-Time Modulation for Multiple-Antenna Communications in Rayleigh Flat Fading," IEEE Transactions on Information Theory, vol. 46, No. 2, pp. 543-564 (2000).

Hochwald, et al., "Systematic Design of Unitary Space-Time Constellations," IEEE Transactons on Information Theory, 2000, 46 (6), 1962-1973.

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

IEEE Std 802.11a-1999 (Supplement to IEEE Std 801.Nov. 1999) "Part 11: Wireless LAN Medium Access Control (MAC) and Physical Layer (PHY) specifications: High-Speed physical Layer in the 5GHZ Band", pp. 1-90, Sep. 1999.

IEEE Std. 802.11g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

International Search Report PCT/US2004/042236, International Search Authority-European Patent Office—Mar. 17, 2005.

Jihoon Choi et al., "Interpolation Based Transmit Beamforming for MIMO-OFDM with Limited Feedback", IEEE Communications Society, 2004, 249-253, Austin, Texas.

Jungnickel et al., "A Mimo System with Reciprocal Transceivers for the Time-division Duplex Mode," Antennas and Propagation Society International Symposium, vol. 2, Jun. 20, 2004, pp. 1267-1270, XP010721570.

Kaiser, "Spatial Transmit Diversity Techniques for Broadband OFDM Systems," IEEE Global Telecommunications Conference, 2000. Globecom '00. San Francisco, CA, Nov. 27-Dec. 1, 2000, vol. 3, pp. 1824-1828, XP001195742.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).

Kim, M. et al.: "Design of Jacobi EVD Processor Based on CORDIC for DOA Estimation with MUSIC Algorithm." Personal, Indoor, and Mobile Radio Communications, 2002. pp. 120-124, The 13th IEEE International Symposium on Sep. 15-18, 2002, Piscataway, NJ, USA, IEEE.

Laroia R et al., "Enhanced Opportunistic Beamforming," Vehicular Technology Conference, 2003. VTC 2003-Fall. IEEE 58th Orlando, FL, USA Oct. 6-9, 2003, pp. 1762-1766, XP010702878.

Li, et al. "Transmit Diversity Over Quasi-Static Fading Channels Using Multiple Antennas and Random Signal Mapping," IEEE Transactions on Communications, vol. 51, No. 11, Nov. 2003, pp. 1918-1926.

Liu et al., "OFDM-MIMO WLAN AP Front-end Gain and Phase Mismatch Calibration," IEEE Radio and Wireless Conference, Sep. 2004, pp. 151-154, XP002330244.

Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.

Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C XP010678152.

Narula, et al., "Performance Limits of Coded Diversity Methods for Transmitter Antenna Arrays," IEEE Transactions on Information Theory, vol. 45, No. 7, Nov. 1999, pp. 2418-2433.

Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01:.

Oksa G et al: "Multi-level parallelism in the block-jacobi SVD algorithm" Parallel and Distribution Processing, 2001. Proceedings. Ninth Euromicr O Workshop. IEEE, Feb. 7, 2001, pp. 306-313, XP010532138, ISBN: 978-0-7695-0987-7.

Pan, et al., "Dynamic Sub-channel Allocation with Adaptive Beamforming for Broadband OFDM Wireless Systems," IEEE Global Telecommunications Conference, 2002. Globecom '02. Taipei, Taiwan, Nov. 17-21, 2002, New York, NY, Nov. 17, 2002, vol. 1, pp. 711-715.

Ralf Seeger et al: "Advance Eigenbeamforming for the 3GPP UMTS FDD Downlink" ITG IEEE Workshop on Smart Antennas, XX, XX, Apr. 4, 2004, pp. 1-8, XP002468805, Section III.

Schafer F., et al.: "Efficient Tracking of Eigenspaces and its application to MIMO systems" Proceedings of the IST Mobile and Wireless Communications Summit, Jun. 18, 2003, pp. 1-6, XP002478514.

Sharif et al., "On the Capacity of MIMO Broadcast Channel with Partial Side Information", Department of Electrical Engineering, CA Institute of Engineering, IEEE 2002, pp. 958-962.

Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Taiwan Search Report—TW093139437—TIPO—May 16, 2012.

T.L. Marzetta, B. Hassibi, B.M Hochwald, "Structured Unitary Space-Time Autocoding Constellations,"IEEE Trans. On IT,vol. 48, No. 4, Apr. 2002.

Winters, J. "Smart antennas for wireless systems", IEEE Personal Communications, Dec. 5, 2003, pp. 1-113.

Written Opinion, PCT/US2004/042236, International Search Authority, European Patent Office, Mar. 17, 2005.

Yao, Huan, "Efficient Signal, Code, and Receiver Designs for MIMO Communication Systems," Ph.D. Thesis, Massachusetts Institute of Technology, Cambridge, Massachusetts, May 21, 2003, 205 pages.

Yu and Cioffi, "Trellis Precoding for the Broadcast Channel," IEEE Global Telecommunications Conference, vol. 2, Electrical Engineering Department, Stanford, University, Stanford, California (2001), pp. 1344-1348.

Damen et al., "Systematic Construction of Full Diversity Algebraic Constellations", IEEE Transactions on Information Theroty, vol. 49, No. 12, Dec. 2003, pp. 3344-3349.

Griffin, Grant R., "Cordic FAQ," Iowegian's dspGuru. pp. 1-6, posted on Dec. 14, 2009.

* cited by examiner

SPATIAL SPREADING IN A MULTI-ANTENNA COMMUNICATION SYSTEM

I. CLAIM OF PRIORITY UNDER 35 U.S.C. §119

This application is a continuation of U.S. patent application Ser. No. 11/008,865, entitled "SPATIAL SPREADING IN A MULTI-ANTENNA COMMUNICATION SYSTEM", filed Dec. 9, 2004, now allowed, which claims the benefit of U.S. Provisional Application Ser. No. 60/531,021, entitled "PSEUDO-RANDOM TRANSMIT STEERING IN A MULTI-ANTENNA COMMUNICATION SYSTEM," filed Dec. 17, 2003, which are incorporated by reference in their entirety.

II. REFERENCE TO CO-PENDING APPLICATIONS FOR PATENT

The present Application for Patent is related to the following co-pending U.S. Patent Applications:

U.S. application Ser. No. 11/009,200, entitled "Data Transmission with Spatial Spreading in a MIMO Communication System", filed Dec. 9, 2004, herewith, assigned to the assignee hereof, and expressly incorporated by reference herein; and U.S. application Ser. No. 11/009,824, entitled "Broadcast Transmission with Spatial Spreading in a Multi-Antenna Communication System", filed Dec. 9, 2004, assigned to the assignee hereof, and expressly incorporated by reference herein.

BACKGROUND

III. Field

The present invention relates generally to data communication, and more specifically to techniques for transmitting data in a multi-antenna communication system.

IV. Background

A multiple-input multiple-output (MIMO) communication system employs multiple ($N_T$) transmit antennas at a transmitting entity and multiple ($N_R$) receive antennas at a receiving entity for data transmission and is denoted as an ($N_T$, $N_R$) system. A MIMO channel formed by the $N_T$ transmit antennas and the $N_R$ receive antennas may be decomposed into $N_S$ spatial channels, where $N_S \leq \min\{N_T, N_R\}$. The $N_S$ spatial channels may be used to transmit data in a manner to achieve greater reliability and/or higher overall throughput for the system.

The $N_S$ spatial channels of the MIMO channel may experience different channel conditions (e.g., different fading, multipath, and interference effects) and may achieve different signal-to-noise-and-interference ratios (SNRs). The SNR of a spatial channel determines its transmission capacity, which is typically quantified by a particular data rate that may be reliably transmitted on the spatial channel. For a time variant MIMO channel, the channel conditions change over time and the SNR of each spatial channel also changes over time. To maximize throughput, the MIMO system may utilize some form of feedback whereby the receiving entity evaluates the spatial channels and provides feedback information indicating the transmission capacity of each spatial channel. The transmitting entity would then adjust data transmission on the spatial channels based on the feedback information.

However, this feedback information may not be available for various reasons. For example, the MIMO system may not support transmission of feedback from the receiving entity. As another example, the MIMO channel may change more rapidly than the rate at which the receiving entity can estimate the channel and/or send the feedback information. In any case, if the transmitting entity does not know the channel conditions, then it may need to transmit data at a very low rate so that the data transmission can be reliably decoded by the receiving entity even under the worst-case channel conditions. The performance of such a system would then be dictated by the expected worst-case channel conditions.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Techniques for performing spatial spreading in a multi-antenna communication system are described herein. The multi-antenna communication system may be a MIMO system or a multiple-input single-output (MISO) system. Spatial spreading refers to the transmission of a data symbol (which is a modulation symbol for data) from multiple transmit antennas simultaneously, possibly with different amplitudes and/or phases determined by a steering vector used for that data symbol. Spatial spreading may also be called transmit steering, pseudo-random transmit steering, steering diversity, matrix pseudo-random steering, vector pseudo-random steering, and so on. The spatial processing techniques can randomize an "effective" MIMO or MISO channel observed by a receiving entity for each block of data symbols transmitted by a transmitting entity so that system performance is not dictated by the worst-case channel conditions.

In an embodiment for transmitting data with spatial spreading in a MIMO system, the transmitting entity processes (e.g., encodes and interleaves) data for $N_D$ data streams and generates $N_D$ blocks of coded data, where $N_D \geq 1$. A block of coded data may also be called a code block or a coded data packet. Each code block is encoded separately at the transmitting entity and decoded separately at the receiving entity. Each code block is symbol mapped to obtain a corresponding block of data symbols. The $N_D$ data symbol blocks for the $N_D$ code blocks are partitioned into $N_M$ data symbol subblocks for transmission in $N_M$ transmission spans, one subblock in each transmission span, where $N_M > 1$. A transmission span can cover time and/or frequency dimensions, as described below. A steering matrix is selected (e.g., from among a set of L steering matrices) for each of the $N_M$ data symbol subblocks. Each data symbol subblock is spatially processed with the steering matrix selected for that subblock to generate transmit symbols, which are further processed and transmitted via $N_T$ transmit antennas in one transmission span. In effect, the $N_D$ data symbol blocks are spatially processed with $N_M$ steering matrices and therefore observe an ensemble of channels as opposed to all blocks observing the same channel. The steering matrices used for spatial spreading are unitary matrices having orthogonal columns or vectors and may be generated as described below.

A MISO system may also transmit data with spatial spreading, as described below. Various aspects and embodiments of the invention are described in further detail below.

The spatial spreading techniques described herein may be used for MIMO and MISO systems. These techniques may also be used for single-carrier and multi-carrier systems. Multiple carriers may be obtained with orthogonal frequency division multiplexing (OFDM), some other multi-carrier modulation techniques, or some other construct. OFDM effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data.

1. MIMO System

For a single-carrier MIMO system, a MIMO channel formed by $N_T$ transmit antennas at the transmitting entity and $N_R$ receive antennas at the receiving entity may be characterized by an $N_R \times N_T$ channel response matrix H, which may be expressed as:

$$H = \begin{bmatrix} h_{1,1} & h_{1,2} & \cdots & h_{1,N_T} \\ h_{2,1} & h_{2,2} & \cdots & h_{2,N_T} \\ \vdots & \vdots & \ddots & \vdots \\ h_{N_R,1} & h_{N_R,2} & \cdots & h_{N_R,N_T} \end{bmatrix}, \quad \text{Eq (1)}$$

where entry for $i=1 \ldots N_R$ and $j=1 \ldots N_T$, denotes the coupling or complex gain between transmit antenna j and receive antenna i.

Data may be transmitted in various manners in the MIMO system. In one simple transmission scheme, one data symbol stream is transmitted from each transmit antenna without any spatial processing, and up to $N_S$ data symbol streams are transmitted simultaneously from the $N_T$ transmit antennas. The model for the MIMO system for this transmission scheme may be expressed as:

$$r = Hs + n, \quad \text{Eq (2)}$$

where s is an $N_T \times 1$ vector with $N_S$ non-zero entries for $N_S$ data symbols to be transmitted on the $N_S$ spatial channels of H;

r is an $N_R \times 1$ vector with entries for $N_R$ received symbols obtained via the $N_R$ receive antennas; and n is a noise vector observed at the receiving entity.

The noise may be assumed to be additive white Gaussian noise (AWGN) with a zero mean vector and a covariance matrix of $\Lambda_n = \sigma^2 I$, where $\sigma^2$ is the variance of the noise and I is the identity matrix.

The $N_S$ data symbol streams transmitted from the $N_T$ transmit antennas interfere with each other at the receiving entity. A given data symbol stream transmitted from one transmit antenna is typically received by all $N_R$ receive antennas at different amplitudes and phases. Each received symbol stream includes a component of each of the $N_S$ transmitted data symbol streams. The $N_R$ received symbol streams would collectively include all of the $N_S$ data symbols streams. However, these $N_S$ data symbol streams are dispersed among the $N_R$ received symbol streams. The receiving entity performs receiver spatial processing on the $N_R$ received symbol streams to recover the $N_S$ data symbol streams sent by the transmitting entity.

The performance that can be achieved for the MIMO system is dependent (to a large extent) on the channel response matrix H. If a high degree of correlation exists within H, then each data symbol stream would observe a large amount of interference from the other streams. This interference or cross-talk cannot be removed by the spatial processing at the receiving entity. The high level of interference degrades the SNR of each affected data symbol stream, possibly to a point where the data symbol stream cannot be decoded correctly by the receiving entity.

For a given channel response matrix H, system capacity may be achieved when the transmitting entity transmits data on $N_S$ eigenmodes (or orthogonal spatial channels) of the MIMO channel using eigenvectors derived from H. If the receiving entity can provide the transmitting entity with either full or partial Channel State Information (CSI), then the transmitting entity can process the data streams in a manner that maximizes the overall throughput for these streams (e.g., by using an optimal or near optimal data rate for each data stream). However, if the transmitting entity is uninformed or misinformed, then the data rate(s) employed for the data streams may result in frame or code block errors for a certain percentage of channel realizations. For example, a "bad" channel response may occur when H exhibits a high degree of correlation, or when there is insufficient scattering, multipath (large coherence bandwidth) and/or temporal fading (large coherence time) in the wireless channel. The occurrence of "bad" channels is random and it is desirable to minimize the percentage of time this can occur for a given data rate selection.

For some MIMO systems, performance may be dictated by the worst-case channel conditions. For example, if the receiving entity cannot send feedback information to indicate the proper data rate to use for each data symbol stream (e.g., because feedback is not supported by the system or the channel conditions change faster than the feedback rate), then the transmitting entity may need to transmit the data symbol streams at low rates so that these streams can be recovered even under the worst-case channel conditions. System performance would then be dictated by the expected worst-case channel conditions, which is highly undesirable.

Spatial spreading may be used to randomize the effective MIMO channel observed by the receiving entity so that system performance is not dictated by the worst-case channel conditions. With spatial spreading, the transmitting entity performs spatial processing with different steering matrices to effectively randomize the MIMO channel so that each code block for each data stream observes an ensemble of channels and is not stuck on a bad channel for an extended period of time.

The spatial processing at the transmitting entity for spatial spreading may be expressed as:

$$x(m) = V(m) \cdot s(m), \quad \text{Eq (3)}$$

where s(m) is an $N_S \times 1$ vector with $N_S$ data symbols to be sent in transmission span m;

V(m) is an $N_T \times N_S$ steering matrix for transmission span m; and x(m) is an $N_T \times 1$ vector with $N_T$ transmit symbols to be sent from the $N_T$ transmit antennas in transmission span m.

In general, up to $N_S$ data symbol streams may be transmitted simultaneously using the $N_S$ spatial channels of H(m). For simplicity, much of the following description assumes that $N_S$ data symbol streams are transmitted simultaneously.

A transmission span may cover time and/or frequency dimensions. For example, in a single-carrier MIMO system, a transmission span may correspond to one symbol period, which is the time duration to transmit one data symbol. As another example, in a multi-carrier MIMO system, such as a MIMO system that utilizes OFDM, a transmission span may correspond to one subband in one OFDM symbol period. A transmission span may also cover multiple symbol periods and/or multiple subbands. Thus, m may be an index for time and/or frequency. The transmission span may also be referred to as a transmission interval, a signaling interval, a slot, and so on.

A set of L steering matrices may be generated as described below and used for spatial spreading. This steering matrix set is denoted as $\{V\}$, or $V(i)$ for $i=1 \ldots L$, where L may be any integer greater than one. One steering matrix in the set may be selected for each transmission span m. The transmitting entity would then perform spatial processing for each transmission span m with the steering matrix $V(m)$ selected for that transmission span, where $V(m) \in \{V\}$. The results of the spatial processing are $N_T$ transmit symbol streams, which are further conditioned and transmitted from the $N_T$ transmit antennas.

The received symbols at the receiving entity with spatial spreading may be expressed as:

$$r(m) = H(m) \cdot V(m) \cdot s(m) + n(m) = H_{\mathit{eff}}(m) \cdot s(m) + n(m), \quad \text{Eq (4)}$$

where $H(m)$ is an $N_R \times N_T$ channel response matrix for transmission span m;

$H_{\mathit{eff}}(m)$ is an $N_R \times N_S$ effective channel response matrix for transmission span m, which is $H_{\mathit{eff}}(m) = H(m) \cdot V(m)$;

$r(m)$ is an $N_R \times 1$ vector with $N_R$ received symbols for transmission span m; and $n(m)$ is a noise vector for transmission span m.

As shown in equation (4), because of the spatial spreading performed by the transmitting entity, the $N_S$ data symbol streams observe the effective channel response $H_{\mathit{eff}}(m)$ instead of the actual channel response $H(m)$. Each data symbol stream is thus sent on a spatial channel of $H_{\mathit{eff}}(m)$ instead of $H(m)$. The steering matrices may be selected such that each data symbol stream observes an ensemble of spatial channels of $H(m)$. Moreover, if different steering matrices are used across a code block, then the data symbols for the code block would observe different channels across the code block.

The receiving entity can perform receiver spatial processing on the received symbols with an estimate of the effective channel response matrix to recover the transmitted data symbol streams. If the receiving entity has knowledge of the steering matrix used by the transmitting entity for each transmission span m, then the receiving entity can estimate the channel response matrix (e.g., based on received pilot symbols) and compute an estimated effective channel response matrix as $\hat{H}_{\mathit{eff}}(m) = \hat{H}(m) \cdot V(m)$, where "^" denotes an estimate of the actual matrix. Alternatively, the receiving entity can directly estimate the effective channel response matrix, $H_{\mathit{eff}}(m)$, e.g., based on received pilot symbols that have been transmitted using $V(m)$. A pilot symbol is a modulation symbol for pilot, which is data that is known a priori by both the transmitting and receiving entities.

In general, any number of ($N_D$) data streams may be transmitted simultaneously via the MIMO channel, where $N_S \geq N_D \geq 1$. For example, if $N_D = N_S$, then one data stream may be transmitted on each of the $N_S$ spatial channels of $H_{\mathit{eff}}(m)$. If $N_D = 1$, then one data stream may be demultiplexed and transmitted on all $N_S$ spatial channels of $H_{\mathit{eff}}(m)$. In any case, each data stream is processed (e.g., encoded, interleaved, and modulated) to obtain data symbols, and the data symbols for all $N_D$ data streams are demultiplexed into $N_S$ data symbol streams for the $N_S$ spatial channels of $H_{\mathit{eff}}(m)$, as described below. A steering matrix is used for spatial processing for one transmission span, which may cover one or multiple data symbol vectors.

Figure 1:
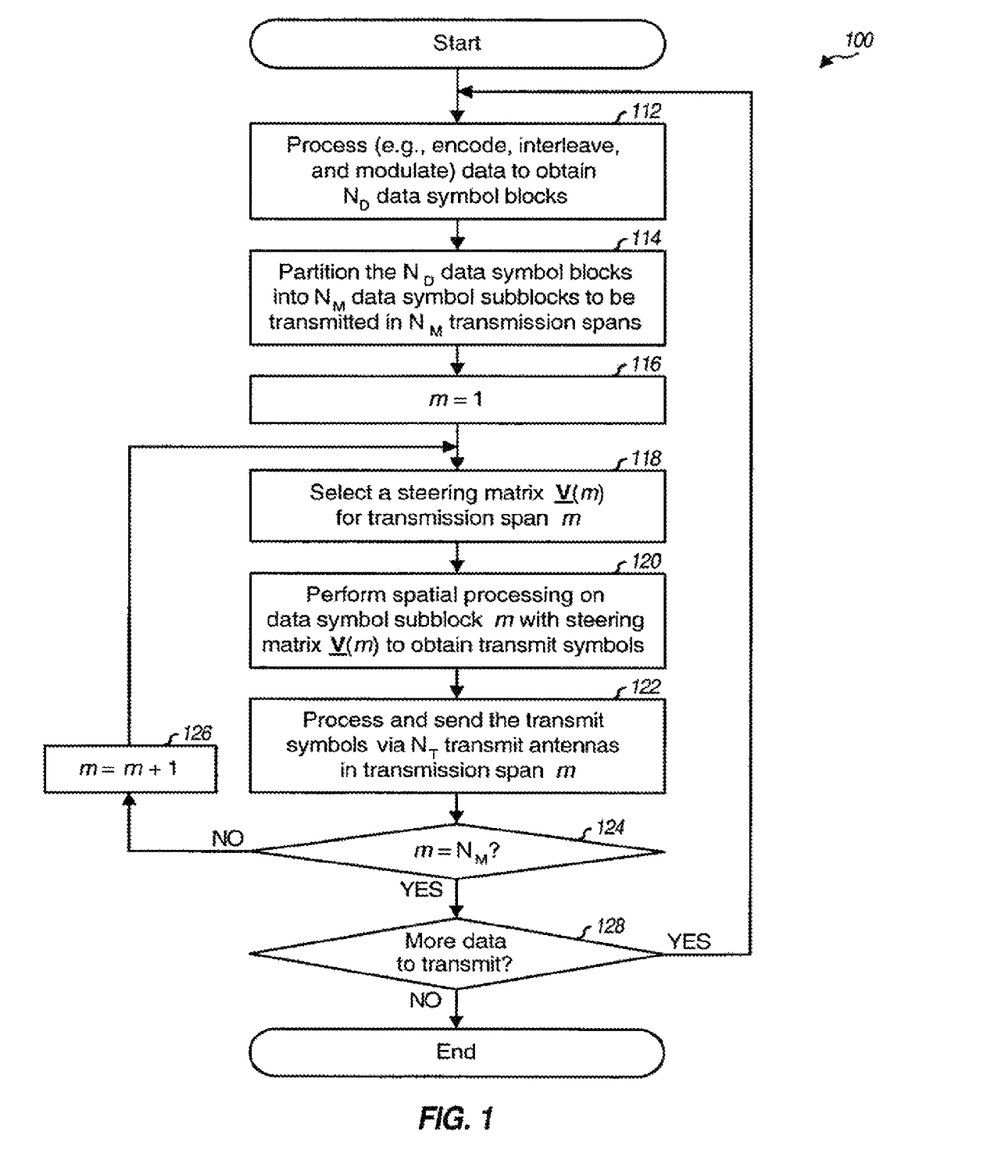
FIG. 1 shows a process for transmitting data with spatial spreading.

FIG. 1 shows a process 100 for transmitting data with spatial spreading. Initially, data is processed to obtain a set of $N_D$ data symbol blocks for $N_D$ data streams, one block for each data stream (block 112). Each data symbol block contains data symbols generated from one code block of coded data (or one coded data packet). The data processing may be performed as described below. The $N_D$ data symbol blocks are partitioned into $N_M$ data symbol subblocks to be transmitted in $N_M$ transmission spans, one subblock in each transmission span (block 114). $N_M$ is also referred to as the block length and is $N_M > 1$. Each subblock may contain one or more data symbols from each of the $N_D$ blocks. For example, if $N_D = N_S$, then each subblock may contain $N_S$ data symbols from $N_S$ blocks for $N_S$ data streams. As another example, if $N_D = 1$, then each subblock may contain $N_S$ data symbols from one block for one data stream. Index m used to denote the transmission span for the current set of data symbol blocks is set to 1 (block 116).

One steering matrix $V(m)$ is used for spatial processing for each transmission span m. This steering matrix $V(m)$ may be selected from the set of L steering matrices $\{V\}$ (block 118). Spatial processing is then performed on data symbol subblock m with steering matrix $V(m)$ to obtain transmit symbols (block 120). If transmission span m covers one data symbol vector, then one vector $s(m)$ with up to $N_S$ data symbols is formed from data symbol subblock m and spatially processed with steering matrix $V(m)$ to obtain the corresponding transmit symbol vector $x(m)$, as shown in equation (3). If transmission span m covers multiple ($N_V$) data symbol vectors, then $N_V$ vectors $s_f(m)$, for $f=1 \ldots N_V$, are formed from data symbol subblock m, and each vector $s_f(m)$ is spatially processed with the same steering matrix $V(m)$ to obtain a corresponding transmit symbol vector $x_f(m)$. In any case, the same steering matrix $V(m)$ is used for spatial processing for all data symbol vectors in transmission span m, and the resultant transmit symbol vectors are processed and transmitted via the $N_T$ transmit antennas in transmission span m (block 122).

A determination is then made whether the $N_M$ data symbol subblocks have been processed and transmitted (i.e., whether $m = N_M$) (block 124). If the answer is 'No', then index m is incremented for the next subblock/transmission span (block 126), and the process returns to block 118. If the answer is 'Yes' for block 124, then a determination is made whether there is more data to transmit (block 128). If the answer is 'Yes', then the process returns to block 112 to start the processing for the next set of data symbol blocks. Otherwise, the process terminates.

As shown in FIG. 1, each set of data symbol blocks is spatially processed with $N_M$ steering matrices to obtain $N_T$ transmit symbol sequences. Each transmit symbol sequence is transmitted via a respective one of the $N_T$ transmit antennas in $N_M$ transmission spans. The $N_M$ steering matrices randomize the effective MIMO channel observed by the receiving entity for the $N_D$ data symbol blocks. The randomization of the MIMO channel results from using different steering matrices for different transmission spans and not necessarily from randomness in the elements of the steering matrices.

As noted above, a transmission span can be defined to cover one or more symbol periods and/or one or more subbands. For improved performance, it is desirable to select the transmission span to be as small as possible so that (1) more steering matrices can be used for each data symbol block and (2) the receiving entity can obtain as many "looks" of the MIMO channel as possible for each data symbol block. The transmission span should also be shorter than the coherence time of the MIMO channel, which is the time duration over which the MIMO channel can be assumed to be approximately static. Similarly, the transmission span should be smaller than the coherence bandwidth of the channel for an OFDM-based system.

Figure 2:
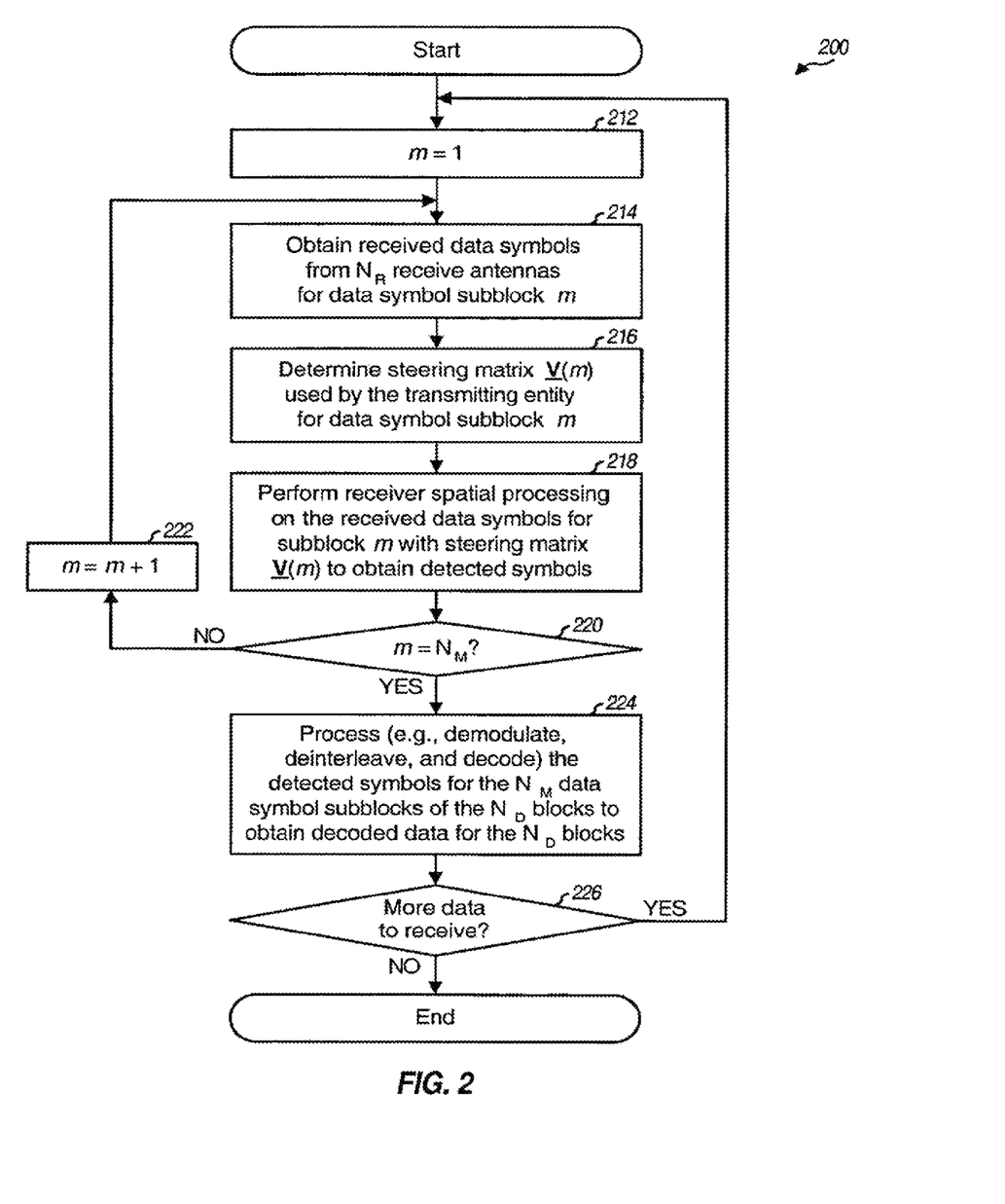
FIG. 2 shows a process for receiving data with spatial spreading.

FIG. 2 shows a process 200 for receiving data with spatial spreading. Initially, index m used to denote the transmission span for the current set of data symbol blocks is set to 1 (block 212). Received data symbols are obtained from the $N_R$ receive antennas for data symbol subblock m (block 214). Steering matrix V(m) used by the transmitting entity for subblock m is determined (block 216) and used to derive a channel response estimate for the effective MIMO channel observed by subblock m. This channel response estimate is then used to perform receiver spatial processing on the received data symbols to obtain detected symbols (or data symbol estimates) for subblock m (block 218).

A determination is then made whether the $N_M$ data symbol subblocks for the current data symbol block set have been received (i.e., whether m=$N_M$) (block 220). If the answer is 'No', then index m is incremented for the next subblock/transmission span (block 222), and the process returns to block 214. If the answer is 'Yes' for block 220, then the detected symbols for all $N_M$ subblocks are processed (e.g., demodulated, deinterleaved, and decoded) to obtain decoded data for the current data symbol block set (block 224). A determination is then made whether there is more data to receive (block 226). If the answer is 'Yes', then the process returns to block 212 to start receiving the next set of data symbol blocks. Otherwise, the process terminates.

A. Steering Matrix Selection

As noted above, a set of L steering matrices may be generated and used for spatial spreading. The steering matrices in the set may be selected for use in various manners. In one embodiment, the steering matrices are selected from the set in a deterministic manner. For example, the L steering matrices may be cycled through and selected in sequential order, starting with the first steering matrix V(1), then the second steering matrix V(2), and so on, and then the last steering matrix V(L). In another embodiment, the steering matrices are selected from the set in a pseudo-random manner. For example, the steering matrix to use for each transmission span m may be selected based on a function $f(m)$ that pseudo-randomly selects one of the L steering matrices, or steering matrix V($f(m)$). In yet another embodiment, the steering matrices are selected from the set in a "permutated" manner. For example, the L steering matrices may be cycled through and selected for use in sequential order. However, the starting steering matrix for each cycle may be selected in a pseudo-random manner, instead of always being the first steering matrix V(1). The L steering matrices may also be selected in various other manners, and this is within the scope of the invention.

The steering matrix selection may also be dependent on the number of steering matrices (L) in the set and the block length ($N_M$). In general, the number of steering matrices may be greater than, equal to, or less than the block length. Steering matrix selection for these three cases may be performed as described below.

If L=$N_M$, then the number of steering matrices matches the block length. In this case, a different steering matrix may be selected for each of the $N_M$ transmission spans used to transmit the set of data symbol blocks. The $N_M$ steering matrices for the $N_M$ transmission spans may be selected in a deterministic, pseudo-random, or permutated manner, as described above. For example, the L steering matrices in the set may be selected in sequential order for each data symbol block set, with the same (pre-selected) or different (pseudo-randomly selected) starting steering matrix being used for each data symbol block set.

If L<$N_M$, then the block length is longer than the number of steering matrices in the set. In this case, the steering matrices are reused for each data symbol block set and may be selected as described above.

If L>$N_M$, then a subset of the steering matrices is used for each data symbol block set. The selection of the specific subset to use for each data symbol block set may be deterministic or pseudo-random. For example, the first steering matrix to use for the current data symbol block set may be the steering matrix after the last one used for a prior data symbol block set.

B. System

Figure 3:
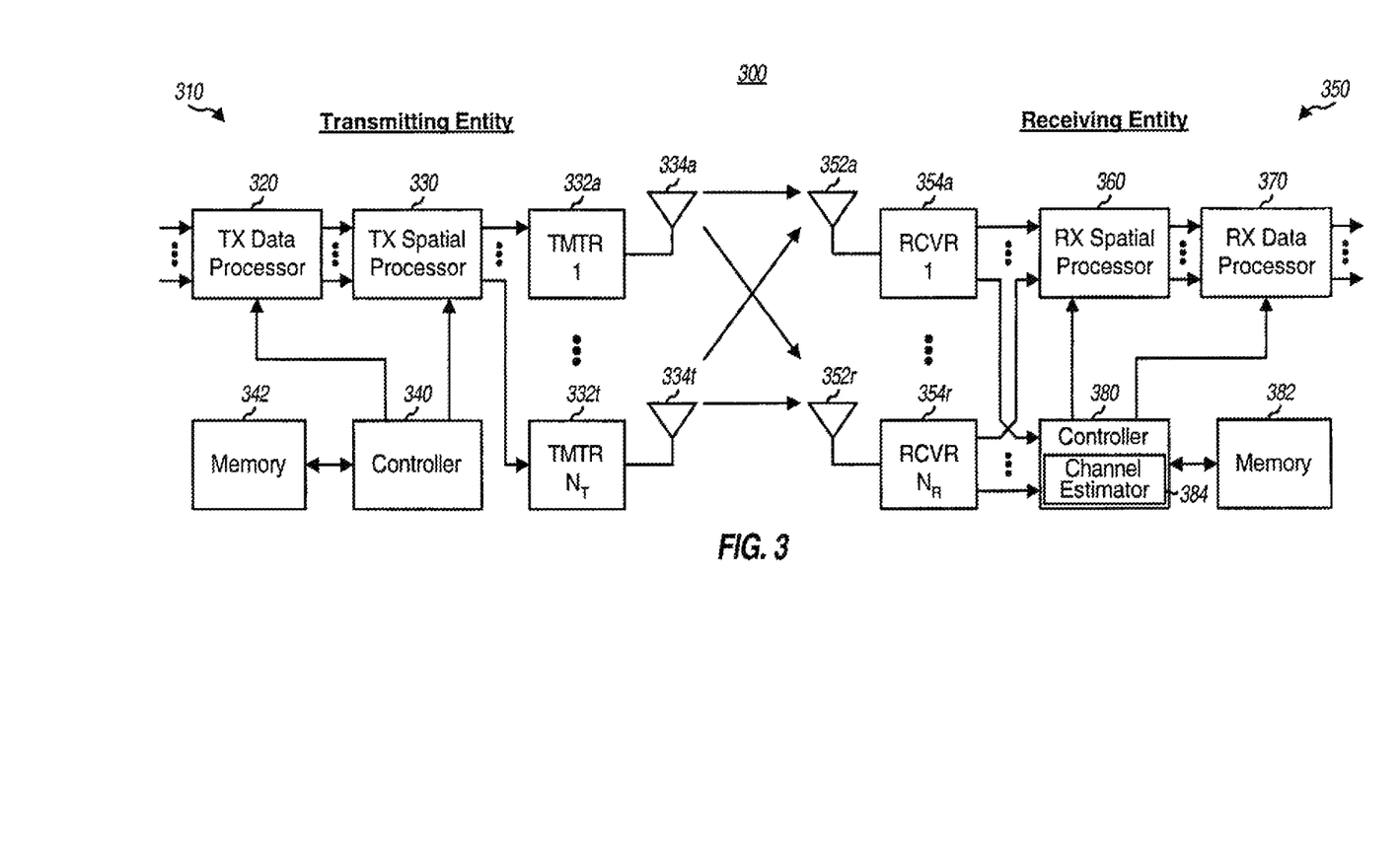
FIG. 3 shows a transmitting entity and a receiving entity in a MIMO system.

FIG. 3 shows a block diagram of a transmitting entity 310 and a receiving entity 350 in a MIMO system 300. At transmitting entity 310, a transmit (TX) data processor 320 receives and processes (e.g., encodes, interleaves, and modulates) traffic data for $N_D$ data streams and provides $N_S$ data symbol streams, where $N_S \geq N_D \geq 1$. A TX spatial processor 330 receives and spatially processes the $N_S$ data symbol streams for spatial spreading, multiplexes in pilot symbols, and provides $N_T$ transmit symbol streams to $N_T$ transmitter units (TMTR) 332a through 332t. The processing by TX data processor 320 is described below, and the spatial processing by TX spatial processor 330 is as described above. Each transmitter unit 332 conditions (e.g., converts to analog, filters, amplifies, and frequency upconverts) a respective transmit symbol stream to generate a modulated signal. $N_T$ transmitter units 332a through 332t provide $N_T$ modulated signals for transmission from $N_T$ antennas 334a through 334t, respectively.

At receiving entity 350, $N_R$ antennas 352a through 352r receive the $N_T$ transmitted signals, and each antenna 352 provides a received signal to a respective receiver unit (RCVR) 354. Each receiver unit 354 performs processing complementary to the processing performed by transmitter units 332 and provides (1) received data symbols to a receive (RX) spatial processor 360 and (2) received pilot symbols to a channel estimator 384 within a controller 380. Receive spatial processor 360 performs spatial processing on $N_R$ received symbol streams from $N_R$ receiver units 354a through 354r with channel estimates from channel estimator 384 and provides $N_S$ detected symbol streams, which are estimates of the $N_S$ data symbol streams sent by transmitting entity 310. An RX data processor 370 then processes (e.g., demaps, deinterleaves, and decodes) the $N_S$ detected symbol streams and provides $N_D$ decoded data streams, which are estimates of the $N_D$ data streams.

Controllers 340 and 380 control the operation of various processing units at transmitting entity 310 and receiving entity 350, respectively. Memory units 342 and 382 store data and/or program codes used by controllers 340 and 380, respectively.

Figure 4:
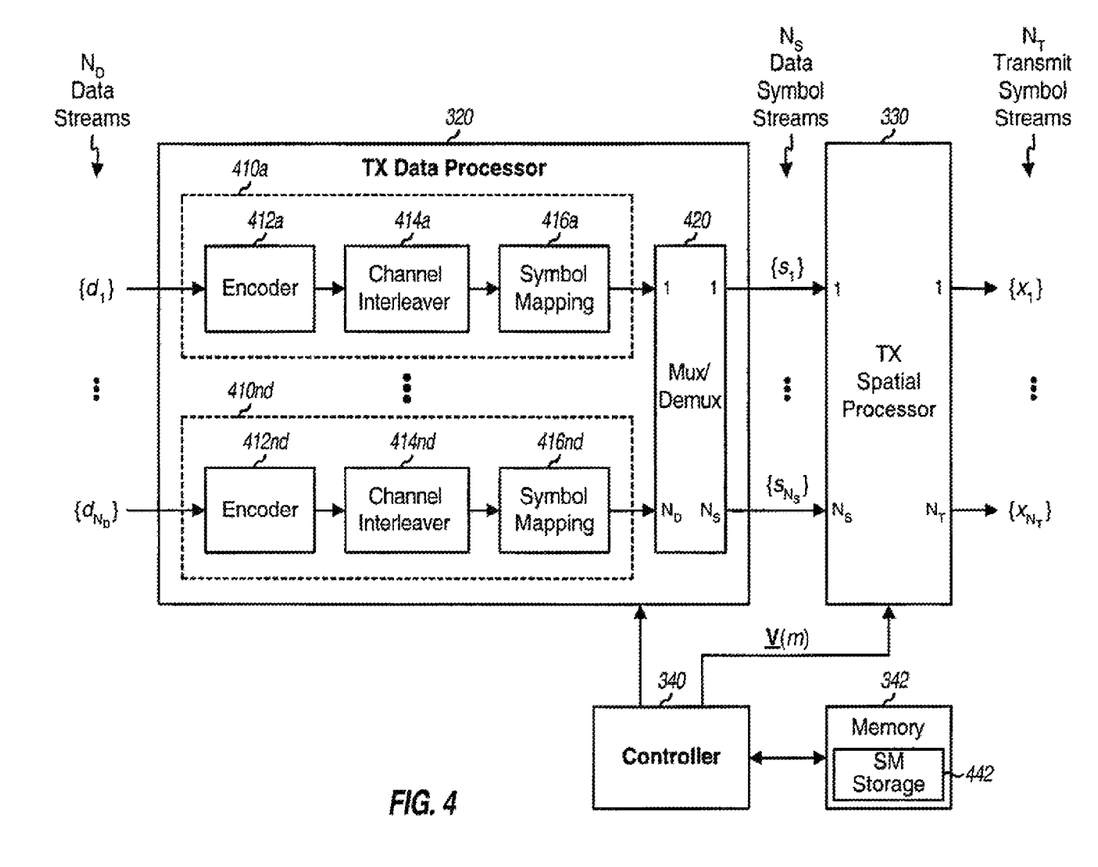
FIG. 4 shows the processing units at the transmitting entity.

FIG. 4 shows a block diagram of the processing units at transmitting entity 310. For the embodiment shown in FIG. 4, TX data processor 320 includes $N_D$ data stream processors 410a through 410nd for the $N_D$ data streams $\{d_l\}$, for l=1 ... $N_D$. Within each data stream processor 410, an encoder 412 receives and encodes data stream $\{d_l\}$ based on a coding scheme and provides code bits. The coding scheme may include cyclic redundancy check (CRC) generation, convolutional coding, Turbo coding, low density parity check (LDPC) coding, block coding, other coding, or a combination thereof. A channel interleaver 414 interleaves (i.e., reorders)

the code bits based on an interleaving scheme to achieve frequency, time, and/or spatial diversity. A symbol mapping unit 416 maps the interleaved bits based on a modulation scheme and provides a stream of data symbols $\{s_l\}$. Unit 416 groups each set of B interleaved bits to form a B-bit value, where B≥1, and further maps each B-bit value to a specific modulation symbol based on the selected modulation scheme (e.g., QPSK, M-PSK, or M-QAM, where $M=2^B$). The encoding is typically performed separately on each data packet in each data stream $\{d_l\}$ to obtain a corresponding coded data packet or code block, and the symbol mapping is then performed on each code block to obtain a corresponding data symbol block.

In FIG. 4, $N_D$ data stream processors 410a through 410nd process the $N_D$ data streams and provide $N_D$ data symbol blocks for each block length of $N_M$ transmission spans. One data stream processor 410 may also process the $N_D$ data streams, e.g., in a time division multiplex (TDM) manner. The same or different coding and modulation schemes may be used for the $N_D$ data streams. Furthermore, the same or different data rates may be used for the $N_D$ data streams. A multiplexer/demultiplexer (Mux/Demux) 420 receives and multiplexes/demultiplexes the data symbols for the $N_D$ data streams into $N_S$ data symbol streams, one data symbol stream for each spatial channel of $H_{eff}(m)$. If $N_D=N_S$, then Mux/Demux 420 can simply provide the data symbols for each data stream as one data symbol stream. If $N_D=1$, then Mux/Demux 420 demultiplexes the data symbols for the one data stream into $N_S$ data symbol streams.

TX spatial processor 330 receives $N_S$ data symbol blocks from TX data processor 320 and $N_M$ steering matrices V(m) from controller 340 for each block length of $N_M$ transmission spans. The steering matrices may be retrieved from a steering matrix (SM) storage 442 within memory unit 342 or generated by controller 340 as they are needed. TX spatial processor 330 performs spatial processing on the data symbols for each transmission span m with the steering matrix V(m) for that transmission span and provides transmit symbols for the transmission span. TX spatial processor 330 multiplexes the transmit symbols for each transmission span m to obtain $N_T$ transmit symbol sequences, which are to be sent from the $N_T$ transmit antennas in one or more symbol periods and/or on one or more subbands. TX spatial processor 330 further multiplexes the $N_T$ transmit symbol sequences for different transmission spans and provides $N_T$ transmit symbol streams, $\{x_j\}$ for $j=1 \ldots N_T$ for the $N_T$ transmit antennas.

Figure 5:
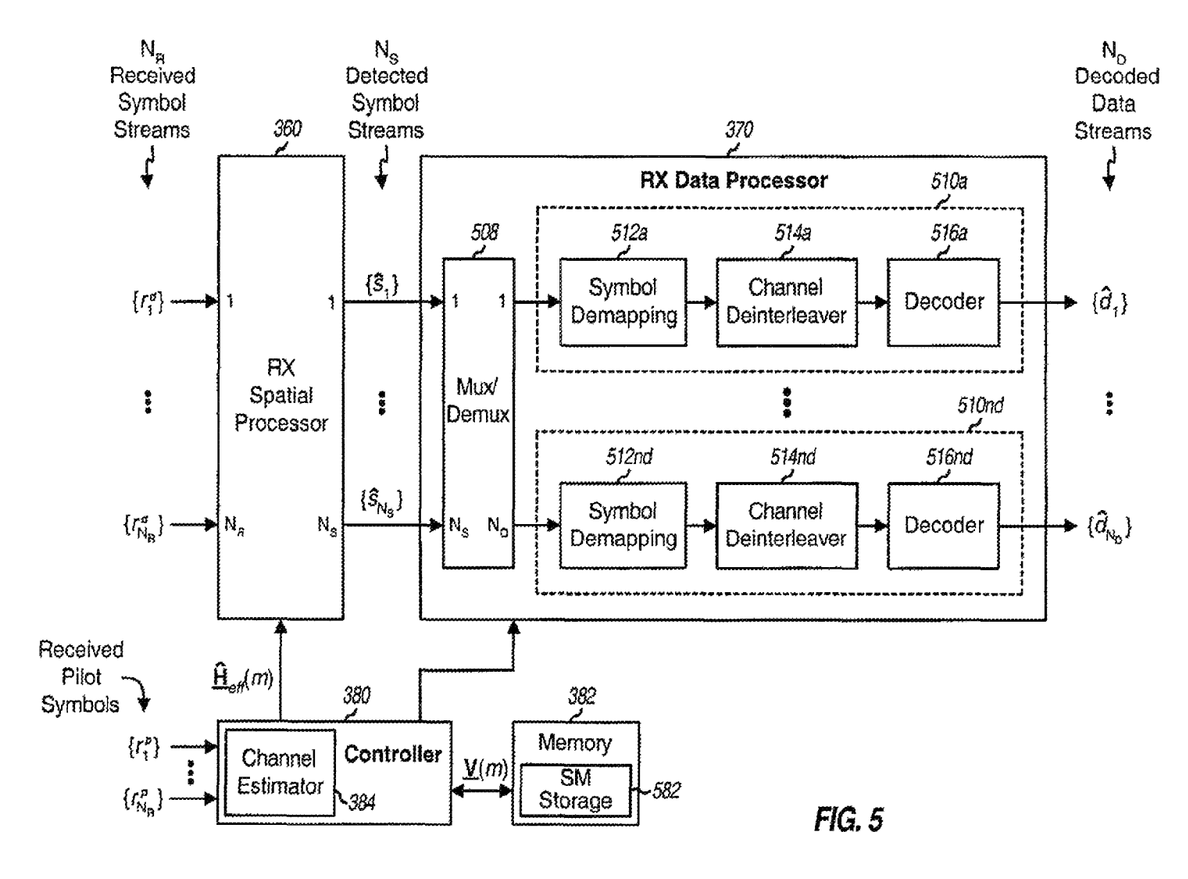
FIG. 5 shows the processing units at the receiving entity.

FIG. 5 shows a block diagram of the processing units at receiving entity 350. $N_R$ receiver units 354a through 354r provide received pilot symbols, $\{r_i^p\}$ for $i=1 \ldots N_R$, to channel estimator 384. In one embodiment, channel estimator 384 derives $\hat{H}(m)$, which is an estimate of the channel response matrix H(m), based on the received pilot symbols. Channel estimator 384 further receives the steering matrix V(m) for each transmission span m and derives the estimated effective channel response matrix as $\hat{H}_{eff}(m)=\hat{H}(m)\cdot V(m)$. For this embodiment, the receiving and transmitting entities are synchronized so that both entities use the same steering matrix V(m) for each transmission span m. In another embodiment, channel estimator 384 directly derives $\hat{H}_{eff}(m)$, which is an estimate of the effective channel response matrix $H_{eff}(m)$, based on the received pilot symbols. For both embodiments, channel estimator 384 provides the estimated effective channel response matrix $\hat{H}_{eff}(m)$ to RX spatial processor 360.

RX spatial processor 360 also obtains received data symbols, $\{r_i^d\}$ for $i=1 \ldots N_R$, from $N_R$ receiver units 354a through 354r. RX spatial processor 360 performs receiver spatial processing on the received data symbols with $\hat{H}_{eff}(m)$ and using any one of a number of receiver spatial processing techniques known in the art. RX spatial processor 360 provides detected symbols (or data symbol estimates) to RX data processor 370.

For the embodiment shown in FIG. 5, RX data processor 370 includes a multiplexer/demultiplexer (Mux/Demux) 508 and $N_D$ data stream processors 510a through 510nd for the $N_D$ data streams. Mux/Demux 508 receives and multiplexes/demultiplexes the $N_S$ detected symbol streams for the $N_S$ spatial channels of $H_{eff}(m)$ into $N_D$ detected symbol streams for the $N_D$ data streams. Mux/Demux 508 operates in a manner complementary to Mux/Demux 420 at transmitting entity 310 in FIG. 4. Within each data stream processor 510, a symbol demapping unit 512 demodulates the detected symbols for the associated data stream in accordance with the modulation scheme used for that stream and provides demodulated data. A channel deinterleaver 514 deinterleaves the demodulated data in a manner complementary to the interleaving performed on that stream by transmitting entity 310. A decoder 516 then decodes the deinterleaved data in a manner complementary to the encoding performed by transmitting entity 310 on that stream. For example, a Turbo decoder or a Viterbi decoder may be used for decoder 516 if Turbo or convolutional coding, respectively, is performed at transmitting entity 310. Decoder 516 provides a decoded data packet for each data symbol block.

C. MIMO-OFDM System

With OFDM, up to $N_F$ modulation symbols may be transmitted on the $N_F$ subbands in each OFDM symbol period. Prior to transmission, these modulation symbols are transformed to the time-domain using an $N_F$-point inverse fast Fourier transform (IFFT) to generate a "transformed" symbol that contains $N_F$ time-domain chips. To combat intersymbol interference (ISI), which is caused by frequency selective fading, a portion (or $N_{cp}$ chips) of each transformed symbol is repeated to form a corresponding OFDM symbol. Each OFDM symbol is transmitted in one OFDM symbol period, which is $N_F+N_{cp}$ chip periods, where $N_{cp}$ is the cyclic prefix length.

For a MIMO system that utilizes OFDM (i.e., a MIMO-OFDM system), the spatial spreading may be performed for each of the subbands used for data transmission. Index m for transmission span is thus substituted with k, n for subband k and OFDM symbol period n. One vector s(k, n) may be formed for each subband k in each OFDM symbol period n. Each vector s(k, n) contains up to $N_S$ data symbols for transmission via the $N_S$ spatial channels of $H_{eff}(k, n)$ for subband k in OFDM symbol period n. Up to $N_F$ vectors, s(k, n) for $k=1 \ldots N_F$, may be transmitted concurrently on the $N_F$ subbands in one OFDM symbol period.

The set of $N_D$ data symbol blocks may be transmitted in various manners in the MIMO-OFDM system. For example, each data symbol block may be transmitted as one entry of the vector s(k, n) for each of the $N_F$ subbands. In this case, each data symbol block is transmitted on all $N_F$ subbands and achieves frequency diversity. Each data symbol block may further span one or multiple OFDM symbol periods. Each data symbol block may thus span frequency and/or time dimensions (by system design) plus spatial dimension (with spatial spreading).

The steering matrices may also be selected in various manners for the MIMO-OFDM system. The steering matrices for the subbands may be selected in a deterministic, pseudo-random, or permutated manner, as described above. For example, the L steering matrices in the set may be cycled through and selected in sequential order for subbands 1 through $N_F$ in OFDM symbol period n, then subbands 1 through $N_F$ in OFDM symbol period n+1, and so on. The transmission span may be defined to cover one or multiple subbands and one or multiple OFDM symbol periods. The number of steering matrices in the set may be less than, equal to, or greater than the number of subbands. The three cases described above for $L=N_M$, $L<N_M$, and $L>N_M$ may also be applied for the subbands, with $N_M$ being replaced with $N_F$.

For the MIMO-OFDM system, each transmitter unit 332 performs OFDM modulation on the transmit symbols for all $N_F$ subbands of an associated transmit antenna to obtain a corresponding stream of OFDM symbols. Each transmitter unit 332 further conditions the OFDM symbol stream to generate the modulated signal. Each receiver unit 354 performs the complementary OFDM demodulation on its received signal to obtain the received data symbols and received pilot symbols. OFDM modulation and demodulation are known in the art and not described herein.

D. Steering Matrices Generation

The steering matrices used for spatial spreading should be unitary matrices and satisfy the following condition:

$$V^H(i) \cdot V(i) = I, \text{ for } i=1 \ldots L, \qquad \text{Eq (5)}$$

where "$H$" denotes the conjugate transpose. Each steering matrix includes $N_S$ columns and may be expressed as $V(i) = [v_1(i) v_2(i) \ldots v_{N_S}(i)]$. For a given steering matrix $V(i)$, the condition in equation (5) indicates that (1) each column of $V(i)$ should have unit length, or $\|v_a(i)\| = v_a^H(i) \cdot v_a(i) = 1$ for $a=1 \ldots N_S$, and (2) the Hermitian inner product of any two columns of $V(i)$ should be zero, or $v_a^H(i) \cdot v_b(i) = 0$ for $a=1 \ldots N_S$, $b=1 \ldots N_S$, and $a \neq b$. This condition ensures that the $N_S$ data symbols transmitted simultaneously using steering matrix $V(i)$ have the same power and are orthogonal to one another prior to transmission.

Some of the steering matrices may also be uncorrelated so that the correlation between any two uncorrelated steering matrices is zero or a low value. This condition may be expressed as:

$$C(ij) = V^H(i) \cdot V(j) \approx 0, \text{ for } i=1 \ldots L, j=1 \ldots L, \text{ and } i \neq j, \qquad \text{Eq (6)}$$

where $C(ij)$ is the correlation matrix for $V(i)$ and $V(j)$ and 0 is a matrix of all zeros.

It may be difficult to satisfy the condition in equation (6) for all steering matrices in the set. The steering matrices may be derived such that the maximum energy of the correlation matrices for all possible pairs of steering matrices is minimized. The correlation matrix $C(ij)$ for a given pair of steering matrices may be computed as shown in equation (6). The energy of $C(ij)$ may be computed as $$E(ij) = \|\underline{C}(ij)\|^2 = \sum_{m=1}^{N_S} \sum_{n=1}^{N_S} |c_{m,n}(ij)|^2,$$

where $c_{m,n}(ij)$ is the element in the m-th row and n-th column of $C(ij)$. The energy $E(ij)$ is also (1) the trace of $C^H(ij) \cdot C(ij)$ and (2) the square of the Frobenius norm of $C(ij)$. The steering matrices are generated such that the maximum energy $E(ij)$ for all pairs of steering matrices is minimized.

The set of L steering matrices {V} may be generated in various manners, some of which are described below. The set of steering matrices may be pre-computed and stored at the transmitting and receiving entities and thereafter retrieved for use as they are needed. Alternatively, these steering matrices may be computed in real time as they are needed.

Figure 6:
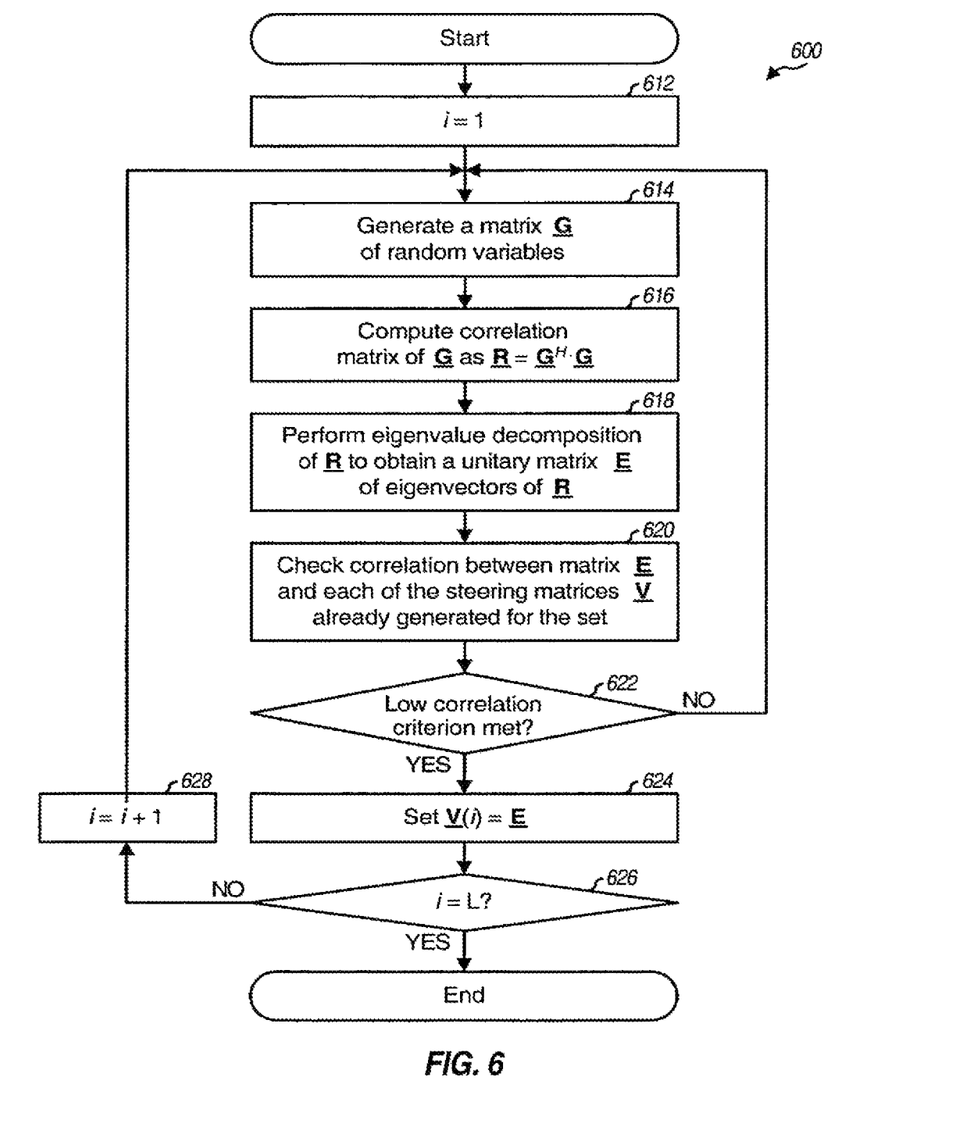
FIG. 6 shows a process for generating a set of steering matrices used for spatial spreading.

FIG. 6 shows an exemplary process 600 of a first scheme for generating the set of steering matrices {V}. Initially, index i is set to 1 for the first steering matrix to be generated (block 612). An $N_S \times N_T$ matrix G of random variables is then generated (block 614). The elements of G are independent identically distributed (IID) complex Gaussian random variables each having zero mean and unit variance. An $N_T \times N_T$ correlation matrix of G is then computed as $R = G^H \cdot G$ (block 616).

Eigenvalue decomposition of the correlation matrix of G is next performed (block 618), as follows:

$$R = E \cdot D \cdot E^H, \qquad \text{Eq (7)}$$

where E is an $N_T \times N_S$ unitary matrix of eigenvectors of R; and D is an $N_S \times N_S$ diagonal matrix of eigenvalues of R.

The diagonal matrix D contains non-negative real values along the diagonal and zeros elsewhere. These diagonal entries are referred to as the eigenvalues of R and represent the power gains for $N_S$ eigenmodes of G.

The correlation between the eigenvector matrix E and each of the steering matrices already generated for the set is then checked (block 620). Block 620 is skipped for the first steering matrix. The check may be achieved, for example, by (1) computing a correlation matrix $C(j)$ between matrix E and each steering matrix $V(j)$ already generated, for $j=1 \ldots (i-1)$, (2) computing the energy of each correlation matrix $C(j)$ as described above, (3) comparing the energy of each correlation matrix against a threshold, and (4) declaring low correlation if the energies for all $i-1$ correlation matrices are less than the threshold. Other tests to check for low correlation may also be used, and this is within the scope of the invention. A determination is then made whether the low correlation criterion is met for the eigenvector matrix E (block 622). The low correlation criterion is not met if the correlation between matrix E and any prior-generated steering matrix exceeds the threshold. If this is the case, then the process returns to block 614 to generate another matrix G. Otherwise, if the low correlation criterion is met, then steering matrix $V(i)$ is set equal to matrix E (block 624). Steering matrix $V(i)$ is a unitary matrix because matrix E is obtained through eigenvalue decomposition, as shown in equation (7).

A determination is then made whether all L steering matrices for the set have been generated (block 626). If the answer is 'no', then index i is incremented (block 628), and the process returns to block 614 to generate the next steering matrix. Otherwise, the process terminates.

The steering matrices generated with process 600 may be improved by (1) identifying the pair of steering matrices with the highest energy for their correlation matrix and (2) "separating" these two steering matrices by pre-multiplying the steering matrices by unitary matrices (so that the resultant matrices are also unitary matrices). The unitary matrices for the pre-multiplication may be selected to modify the two steering matrices in a deterministic or random manner. The process may be iterated until the maximum energy for the correlation matrix cannot be reduced further.

In a second scheme, the set of L steering matrices is generated based on a set of $(\log_2 L)+1$ independent isotropically distributed unitary matrices. A random unitary matrix is isotropically distributed if its probability density is unchanged by pre-multiplication by any deterministic $N_T \times N_T$ unitary matrix. Index i for the steering matrices in the set may be denoted as $i = l_1 l_2 \ldots l_Q$, where $Q = \log_2 L$, $l_1$ is the first bit of index i, $l_Q$ is the last bit of index i, and each bit can take on a value of either 0 or 1. The L steering matrices may then be generated as follows:

$$V(l_1 l_2 \ldots l_Q) = \Omega_1^{l_1} \cdot \Omega_2^{l_2} \cdot \ldots \cdot \Omega_Q^{l_Q} \cdot V_0, \text{ for } l_1, l_2, \ldots, l_Q \in \{0,1\}, \qquad \text{Eq (8)}$$

where $V_0$ is an $N_T \times N_S$ independent isotropically distributed unitary matrix; and $\Omega_j^{i,j}$, for j=1 ... Q, is an $N_T \times N_T$ independent isotropically distributed unitary matrix.

Matrix $V_0$ may be defined, for example, as $V_0^T = [I_{N_S} \ 0]$, where $I_{N_S}$ is an $N_S \times N_S$ identity matrix. The second scheme is described in further detail by T. L. Marzetta et al. in "Structured Unitary Space-Time Autocoding Constellations," IEEE Transaction on Information Theory, Vol. 48, No. 4, April 2002.

In a third scheme, the set of L steering matrices is generated by successively rotating an initial unitary steering matrix V(1) in an $N_T$-dimensional complex space, as follows:

$$V(i+1) = \Theta^i \cdot V(1), \text{ for } i=1 \ldots L-1, \quad \text{Eq (9)}$$

where $\Theta^i$ is an $N_T \times N_T$ diagonal unitary matrix that may be defined as:

$$\Theta^i = \begin{bmatrix} e^{j2\pi \cdot u_1 \cdot i/L} & 0 & \cdots & 0 \\ 0 & e^{j2\pi \cdot u_2 \cdot i/L} & \cdots & 0 \\ \vdots & \vdots & \ddots & \vdots \\ 0 & 0 & \cdots & e^{j2\pi \cdot u_{N_T} \cdot i/L} \end{bmatrix} \quad \text{Eq (10)}$$

and $u_1, u_2, \ldots u_{N_T}$ are $N_T$ different values, each within the range of 0 to L−1, which are chosen such that the correlation between the resulting steering matrices generated with the matrix $\Theta^i$ is as low as possible. The $N_T$ diagonal elements of $\Theta^i$ are L-th roots of unity. The initial unitary steering matrix V(1) may be formed with $N_S$ different columns of an $N_T \times N_T$ Fourier matrix D, where the (n, m)-th entry, $w_{n,m}$, is given as:

$$w_{n,m} = e^{-j2\pi \frac{(n-1)(m-1)}{N_T}}, \text{ for } n = \{1 \ldots N_T\} \text{ and } m = \{1 \ldots N_T\}, \quad \text{Eq (11)}$$

where n is a row index and m is a column index. The third scheme is described in further detail by B. M. Hochwald et al. in "Systematic Design of Unitary Space-Time Constellations," IEEE Transaction on Information Theory, Vol. 46, No. 6, September 2000.

In a fourth scheme, the set of L steering matrices is generated with a base matrix B and different scalars. The base matrix may be a Walsh matrix, a Fourier matrix, or some other matrix. A 2×2 Walsh matrix be expressed as $$\underline{W}_{2 \times 2} = \begin{bmatrix} 1 & 1 \\ 1 & -1 \end{bmatrix}.$$

A larger size Walsh matrix $W_{2N \times 2N}$ may be formed from a smaller size Walsh matrix $W_{N \times N}$, as follows:

$$\underline{W}_{2N \times 2N} = \begin{bmatrix} \underline{W}_{N \times N} & \underline{W}_{N \times N} \\ \underline{W}_{N \times N} & -\underline{W}_{N \times N} \end{bmatrix}. \quad \text{Eq (12)}$$

Walsh matrices have dimensions that are powers of two. Fourier matrices of any square dimension (e.g., 2, 3, 4, 5, and so on) may be formed as shown in equation (11).

An $N_T \times N_T$ Walsh matrix W, Fourier matrix D, or some other matrix may be used as the base matrix B to form other steering matrices. Each of rows 2 through $N_T$ of the base matrix may be independently multiplied with one of M different possible scalars, where M>1. $M^{N_T-1}$ different steering matrices may be obtained from $M^{N_T-1}$ different permutations of the M scalars for the $N_T-1$ rows. For example, each of rows 2 through $N_T$ may be independently multiplied with a scalar of +1, −1, +j, or −j, where $j=\sqrt{-1}$. For $N_T=4$ and M=4, 64 different steering matrices may be generated from the base matrix B with the four different scalars. Additional steering matrices may be generated with other scalars, e.g., $e^{\pm j3\pi/4}$, $e^{\pm j\pi/4}$, $e^{\pm j\pi/8}$, and so on. In general, each row of the base matrix may be multiplied with any scalar having the form $e^{j\theta}$, where $\theta$ may be any phase value. $N_T \times N_T$ steering matrices may be generated as $V(i) = g_{N_T} \cdot B(i)$, where $g_{N_T} = 1/\sqrt{N_T}$ and B(i) is the i-th matrix generated with the base matrix B. The scaling by $g_{N_T}$ ensures that each column of V(i) has unit power.

Other schemes may also be used to generate the set of steering matrices, and this is within the scope of the invention. In general, the steering matrices may be generated in a pseudo-random manner (e.g., such as the first scheme) or a deterministic manner (e.g., such as the second and third schemes).

E. Performance

Figure 7:
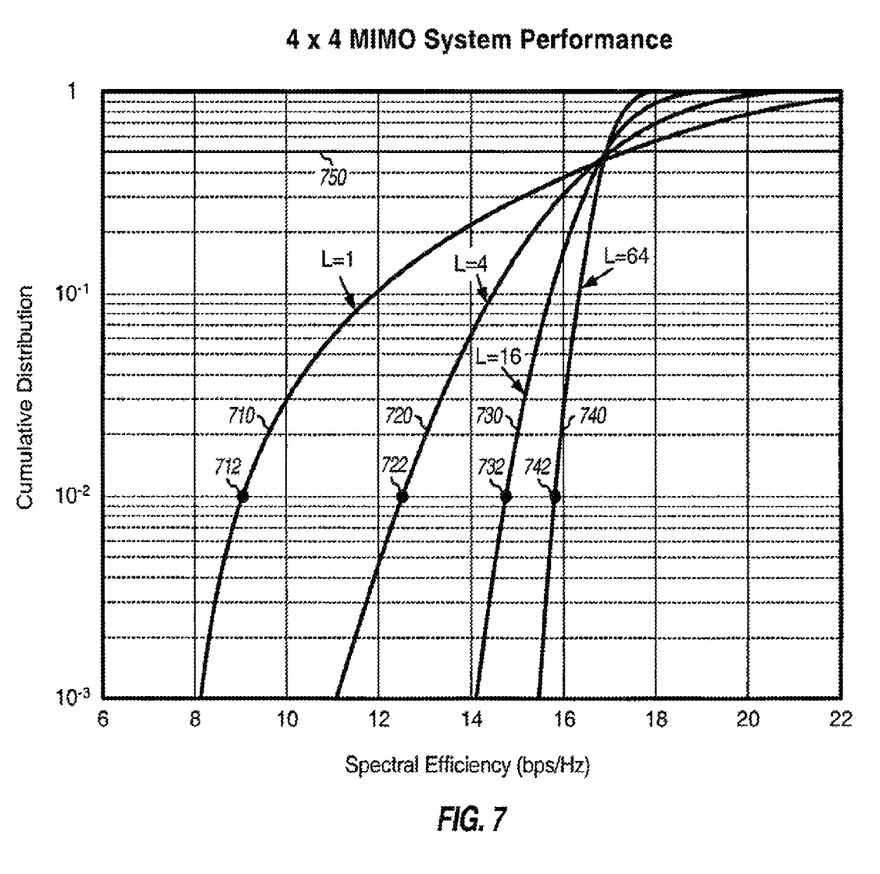
FIG. 7 shows plots of overall spectral efficiency achieved for a 4×4 MIMO system.

FIG. 7 shows plots of the cumulative distribution function (CDF) of the overall spectral efficiency achieved for an exemplary MIMO system. For this MIMO system, the transmitting entity is equipped with four transmit antennas ($N_T=4$) and the receiving entity is equipped with four receive antennas ($N_R=4$). The MIMO channel is assumed to be as described above for equation (1). The received SNR, which is the SNR of the received symbols prior to the receiver spatial processing, is assumed to be 20 dB. The receiving entity is assumed to be using a minimum mean square error (MMSE) receiver spatial processing technique.

Plot 710 shows the CDF of the overall spectral efficiency for the case in which spatial spreading is not performed. Spectral efficiency is given in units of bits per second per Hertz (bps/Hz). For a given spectral efficiency x, the CDF indicates the probability of the overall spectral efficiency being worse than x. For example, point 712 indicates that there is a one percent ($10^{-2}$) probability of the overall spectral efficiency being worse than 9 bps/Hz without spatial spreading. If the transmitting entity encodes and transmits data at an overall rate of 9 bps/Hz, then there is a one percent probability that the receiving entity will not be able to correctly decode the data. This probability is also commonly referred to as the "outage" probability.

Plots 720, 730 and 740 show the CDFs of the overall spectral efficiency achieved with spatial spreading using 4, 16 and 64 steering matrices, respectively. Points 722, 732 and 742 indicate that there is a one percent probability of the overall spectral efficiency being worse than 12.5, 14.6 and 15.8 bps/Hz, respectively, with 4, 16 and 64 steering matrices, respectively. For one percent outage probability, the use of spatial spreading improves the overall spectral efficiency from 9 bps/Hz to approximately 15.8 bps/Hz (with 64 steering matrices) for the exemplary MIMO system. Line 750 is for 50% probability and may be referenced to determine the average overall spectral efficiency for the four cases.

FIG. 7 shows the performance for an exemplary MIMO system with some specific assumptions. In general, the amount of improvement may be dependent on various factors such as, for example, the characteristics of the MIMO channel, the number of transmit and receive antennas, the spatial processing technique used at the receiving entity, the coding and modulation schemes used for data transmission, and so on.

2. MISO System

A MISO system employs multiple ($N_T$) transmit antennas at a transmitting entity and a single receive antenna at a receiving entity for data transmission. A MISO channel formed by the $N_T$ transmit antennas and the single receive antenna is composed of a single spatial channel. The MISO channel may be characterized by a $1 \times N_T$ channel response row vector h, which is $h=[h_1 \ h_2 \ \ldots \ h_{N_T}]$, where entry $h_j$, for $j=1 \ldots N_T$, denotes the coupling between transmit antenna j and the single receive antenna.

Spatial spreading may be used to randomize an effective MISO channel observed by the single-antenna receiving entity so that performance is not dictated by the worst-case channel conditions. For the MISO system, the transmitting entity performs spatial processing with a set of steering vectors.

The spatial processing at the transmitting entity for spatial spreading in the MISO system may be expressed as:

$$x_{miso}(m) = v(m) \cdot s(m), \quad \text{Eq (13)}$$

where s(m) is a data symbol to be sent in transmission span m;
v(m) is an $N_T \times 1$ steering vector for transmission span m; and
$x_{miso}$(m) is an $N_T \times 1$ vector with $N_T$ transmit symbols to be sent from the $N_T$ transmit antennas in transmission span m.

A set of L steering vectors may be generated and denoted as $\{v\}$, or v(i) for $i=1 \ldots L$. One steering vector in the set may be selected for each transmission span m (e.g., in a pseudo-random or deterministic manner, similar to that described above for the steering matrices). The transmitting entity performs spatial processing for each transmission span m with the steering vector v(m) selected for that transmission span.

The received symbols at the receiving entity with spatial spreading may be expressed as:

$$r(m) = h(m) \cdot v(m) \cdot s(m) + n(m) = h_{eff}(m) \cdot s(m) + n(m), \quad \text{Eq (14)}$$

where r(m) is a received symbol for transmission span m;
$h_{eff}$(m) is an effective channel response for transmission span m, which is $h_{eff}(m) = h(m) \cdot v(m)$; and
n(m) is the noise for transmission span m.

As shown in equation (14), because of the spatial spreading performed by the transmitting entity, a data symbol stream observes the effective channel response $h_{eff}$(m), which includes the actual channel response h(m) and the steering vector v(m). The receiving entity can perform detection (e.g., matched filtering or equalization) on the received symbols r(m) with an effective channel response estimate $\hat{h}_{eff}$(m) to obtain detected symbols ŝ(m), as is known in the art. The receiving entity further processes (e.g., demodulates, deinterleaves, and decodes) the detected symbols r(m) to obtain decoded data.

The steering vectors used for spatial spreading in the MISO system should have equal energy (e.g., $\|v(i)\|^2 = v^H(i) \cdot v(i) = 1$ for $i=1 \ldots L$) so that the transmit power used for the data symbols is not varied by the spatial spreading. Some of the steering vectors may also be uncorrelated so that the correlation between any two uncorrelated steering vectors is zero or a low value. This condition may be expressed as:

$$c(ij) = v^H(i) \cdot v(j) \approx 0, \text{ for } i=1 \ldots L, j=1 \ldots L, \text{ and } i \neq j, \quad \text{Eq (15)}$$

where c(ij) is the correlation between steering vectors v(i) and v(j).

The set of L steering vectors may be generated in various manners (e.g., in a pseudo-random or deterministic manner, similar to that described above for the steering matrices). The columns of the steering matrices generated as described above may be used for the steering vectors for spatial spreading.

The spatial spreading techniques described herein may be implemented by various means. For example, these techniques may be implemented in hardware, software, or a combination thereof. For a hardware implementation, the processing units used to perform spatial spreading at the transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform spatial processing at the receiving entity may also be implemented within one or more ASICs, DSPs, processors, and so on.

For a software implementation, the spatial spreading techniques may be implemented with modules (e.g., procedures, functions, and so on) that perform the functions described herein. The software codes may be stored in memory units (e.g., memory units 342 and 382 in FIG. 3) and executed by a processor (e.g., controllers 340 and 380). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing data for transmission in a wireless multiple-input multiple-output (MIMO) communication system, comprising:

processing data to obtain at least one block of data symbols;

performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and partitioning the at least one block of data symbols into a plurality of subblocks of data symbols; and selecting a steering matrix for each subblock of data symbols, and wherein the performing spatial processing on the at least one block of data symbols comprises performing spatial processing on each subblock of data symbols with the steering matrix selected for the subblock, wherein the partitioning the at least one block of data symbols comprises partitioning a single block of data symbols into a plurality of subblocks of data symbols.

2. A method of processing data for transmission in a wireless multiple-input multiple-output (MIMO) communication system, comprising:
- processing data to obtain at least one block of data symbols;
- performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and
- partitioning the at least one block of data symbols into a plurality of subblocks of data symbols; and
- selecting a steering matrix for each subblock of data symbols, and wherein the performing spatial processing on the at least one block of data symbols comprises performing spatial processing on each subblock of data symbols with the steering matrix selected for the subblock,
- wherein the partitioning the at least one block of data symbols comprises
- partitioning a plurality of blocks of data symbols into a plurality of subblocks of data symbols.

3. A method of processing data for transmission in a wireless multiple-input multiple-output (MIMO) communication system, comprising:
- processing data to obtain at least one block of data symbols;
- performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and
- partitioning the at least one block of data symbols into a plurality of subblocks of data symbols; and
- selecting a steering matrix for each subblock of data symbols, and wherein the performing spatial processing on the at least one block of data symbols comprises performing spatial processing on each subblock of data symbols with the steering matrix selected for the subblock,
- wherein the partitioning the at least one block of data symbols comprises
- partitioning the at least one block of data symbols into a plurality of subblocks of data symbols such that each subblock includes data symbols from each of the at least one block.

4. A method of processing data for transmission in a wireless multiple-input multiple-output (MIMO) communication system, comprising:
- processing data to obtain at least one block of data symbols;
- performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and
- partitioning the at least one block of data symbols into a plurality of subblocks of data symbols;
- selecting a steering matrix for each subblock of data symbols, and wherein the performing spatial processing on the at least one block of data symbols comprises performing spatial processing on each subblock of data symbols with the steering matrix selected for the subblock; and
- transmitting the plurality of subblocks of spatially processed data symbols in a plurality of transmission spans, one subblock in each transmission span.

5. A method of processing data for transmission in a wireless multiple-input multiple-output (MIMO) communication system, comprising:
- processing data to obtain at least one block of data symbols;
- performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and
- partitioning the at least one block of data symbols into a plurality of subblocks of data symbols;
- selecting a steering matrix for each subblock of data symbols, and wherein the performing spatial processing on the at least one block of data symbols comprises performing spatial processing on each subblock of data symbols with the steering matrix selected for the subblock; and
- transmitting each subblock of spatially processed data symbols from the plurality of transmit antennas in one symbol period.

6. A method of processing data for transmission in a wireless multiple-input multiple-output (MIMO) communication system, comprising:
- processing data to obtain at least one block of data symbols;
- performing spatial processing on the at least one block of data symbols with a plurality of steering matrices to obtain a plurality of sequences of transmit symbols for a plurality of transmit antennas, wherein the plurality of steering matrices randomize an effective MIMO channel observed by a receiving entity for the at least one block of data symbols; and
- partitioning the at least one block of data symbols into a plurality of subblocks of data symbols;
- selecting a steering matrix for each subblock of data symbols, and wherein the performing spatial processing on the at least one block of data symbols comprises performing spatial processing on each subblock of data symbols with the steering matrix selected for the subblock; and
- transmitting each subblock of spatially processed data symbols from the plurality of transmit antennas on a respective group of at least one frequency subband.

* * * * *